US010668951B2

United States Patent
Ayukawa (10) Patent No.: US 10,668,951 B2
(45) Date of Patent: *Jun. 2, 2020

(54) VEHICLE LOWER SECTION STRUCTURE

(71) Applicant: TOYOTA JIDOSHA KABUSHIKI KAISHA, Toyota-shi (JP)

(72) Inventor: Tatsuya Ayukawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,084

(22) Filed: Jan. 9, 2019

(65) Prior Publication Data

US 2019/0135344 A1 May 9, 2019

Related U.S. Application Data

(63) Continuation of application No. 15/968,229, filed on May 1, 2018, now Pat. No. 10,220,880.

(30) Foreign Application Priority Data

Jun. 22, 2017 (JP) ................. 2017-122365

(51) Int. Cl.
*B62D 21/11* (2006.01)
*B62D 21/02* (2006.01)
(Continued)

(52) U.S. Cl.
CPC ............ *B62D 21/02* (2013.01); *B60L 53/12* (2019.02); *B60L 53/22* (2019.02); *B62D 21/11* (2013.01); *B62D 25/08* (2013.01); *H02J 7/025* (2013.01)

(58) Field of Classification Search
CPC ............ B60L 11/1809; B60L 11/1811; B60L 11/1812; B60L 11/182; B60L 53/12;
(Continued)

(56) References Cited

U.S. PATENT DOCUMENTS 4,800,328 A * 1/1989 Bolger .................. B60L 5/005
320/106
6,421,600 B1 * 7/2002 Ross ..................... B60L 5/005
701/117
(Continued)

FOREIGN PATENT DOCUMENTS

| JP | 2014-104976 | 6/2014 |
|----|-------------|--------|
| JP | 2015-24779 | 2/2015 |
| JP | 2016-159816 | 9/2016 |

*Primary Examiner* — John D Walters
(74) *Attorney, Agent, or Firm* — Oblon, McClelland, Maier & Neustadt, L.L.P.

(57) ABSTRACT

A vehicle lower section structure includes: a suspension member, formed in a frame shape, including left and right side-rails extending in a vehicle front-rear direction, and front and rear cross members coupling the left and right side-rails together in a vehicle width direction; a contactless charger fastened to both a left side and a right side of a front portion and a rear portion of the suspension member, and being supported by the suspension member; and an electrical component disposed above the contactless charger and is electrically connected to the contactless charger, the electrical component is fastened to both the left side and the right side of the front portion and the rear portion of the suspension member and is supported by the suspension member.

11 Claims, 8 Drawing Sheets

(51) Int. Cl.
  *B60L 53/22* (2019.01)
  *B60L 53/12* (2019.01)
  *B62D 25/08* (2006.01)
  *H02J 7/02* (2016.01)

(58) Field of Classification Search
  CPC ........... B60L 53/22; H02J 7/025; H02J 50/10;
  B62D 1/02; B62D 21/02; B62D 21/11;
  B62D 25/08
  USPC .......................................................... 180/2.1
  See application file for complete search history.

(56) References Cited

U.S. PATENT DOCUMENTS

| | | | |
|---|---|---|---|
| 9,120,506 B2* | 9/2015 | Isakiewitsch | B62D 21/11 |
| 9,725,004 B2* | 8/2017 | Asai | B60K 1/04 |
| 9,889,756 B2* | 2/2018 | Amari | B60L 11/182 |
| 2014/0145423 A1 | 5/2014 | Isakiewitsch et al. | |
| 2018/0294683 A1* | 10/2018 | Sakamoto | B60L 53/12 |

* cited by examiner

VEHICLE LOWER SECTION STRUCTURE

CROSS-REFERENCE TO RELATED APPLICATION

This application is a continuation of U.S. application Ser. No. 15/968,229, filed May 1, 2018, which claims priority under 35 U.S.C. § 119 from Japanese Patent Application No. 2017-122365, filed Jun. 22, 2017, the disclosures of each of which are incorporated by reference herein.

BACKGROUND

Technical Field

The present disclosure relates to a vehicle lower section structure.

Related Art

Japanese Patent Application Laid-Open (JP-A) No. 2014-104976 describes a sub-frame of a front body or a rear body of an automobile. The sub-frame includes left and right side-members, a cross member coupling left and the right side-members together, and a reinforcement structure for increasing twisting rigidity. The reinforcement structure is configured as a plate having shear strength, and has an open space at its center. A charging module is fitted inside the open space. The charging module is one configuration component of the reinforcement structure, and the charging module itself contributes to reinforcement of the sub-frame. The reinforcement structure is thus also utilized for other functions.

However, in the above disclosure, the reinforcement structure configured as a plate is attached to the sub-frame (suspension member), and thus the reinforcement structure increases the vehicle weight. Thus, there is room for improvement from the viewpoint of efficiently reinforcing the suspension member.

SUMMARY

The present disclosure provides a vehicle lower section structure that may efficiently reinforce a suspension member.

A first aspect of the present disclosure is a vehicle lower section structure including: a suspension member, formed in a frame shape, including left and right side-rails extending in a vehicle front-rear direction, and front and rear cross members coupling the left and right side-rails together in a vehicle width direction; a contactless charger fastened to both a left side and a right side of a front portion and a rear portion of the suspension member, and being supported by the suspension member; and an electrical component disposed above the contactless charger and is electrically connected to the contactless charger, the electrical component is fastened to both the left side and the right side of the front portion and the rear portion of the suspension member and is supported by the suspension member.

In the first aspect of the present disclosure, the suspension member includes the left and right side-rails extending in the vehicle front-rear direction, and the front and rear cross members coupling the left and right side-rails together in the vehicle width direction, such that the suspension member is formed in a frame shape. The suspension member supports the contactless charger and the electrical component that is disposed above the contactless charger and electrically connected to the contactless charger. The contactless charger and the electrical component are fastened to both the left side and the right side of the front portion and the rear portion of the suspension member. Thus, the contactless charger and the electrical component function as members that reinforce the suspension member, enabling the suspension member to be more efficiently reinforced than in a configuration in which a reinforcement structure configured as a plate is attached to the suspension member.

In a second aspect of the present disclosure, in the above-described first aspect, the contactless charger and the electrical component may be co-fastened to the suspension member.

In the second aspect of the present disclosure, the contactless charger and the electrical component are co-fastened to the suspension member. This enables the fastening structures of the contactless charger and the electrical component to be simplified, enabling the number of fastening processes and components, as well as the weight, to be reduced.

A third aspect of the present disclosure, in the above-described aspects, may further include a suspension including a lower arm, wherein the lower arm may include an arm portion extending in the vehicle width direction and overlapping a vehicle axle in plan view, the arm portion being coupled to the suspension member; the electrical component may be fastened to the cross member disposed at the vehicle front-rear direction inner side; and a coupling portion of the arm portion coupled to the suspension member, the cross member disposed at the vehicle front-rear direction inner side, and an end portion on the vehicle front-rear direction inner side of the electrical component, may be arranged at positions aligned in the vehicle front-rear direction.

In the third aspect of the present disclosure, the arm portion of the lower arm included in the suspension is coupled to the suspension member. The arm portion extends in the vehicle width direction and overlaps a vehicle axle when seen in plan view. The coupling portion of the arm portion coupled to the suspension member, the cross member disposed at the vehicle front-rear direction inner side to which the electrical component is fastened, and the end portion on the vehicle front-rear direction inner side of the electrical component, are arranged at positions aligned in the vehicle front-rear direction. This enables lateral force when a vehicle turns to be effectively borne by the inertial mass of the cross member disposed at the vehicle front-rear direction inner side and the electrical component.

In a fourth aspect of the present disclosure, in the above-described third aspect, the contactless charger may be fastened to the cross member disposed at the vehicle front-rear direction inner side; and the cross member disposed at the vehicle front-rear direction inner side, and an end portion on the vehicle front-rear direction inner side of the contactless charger, may be arranged at positions aligned in the vehicle front-rear direction.

According to the fourth aspect of the present disclosure, the contactless charger is fastened to the cross member disposed at the vehicle front-rear direction inner side in addition to the electrical component. This cross member and a rear end portion of the contactless charger are arranged at positions aligned in the vehicle front-rear direction. Thus, in addition to the inertial mass of this cross member and the electrical component, the inertial mass of the contactless charger is also utilized to bear lateral force in a vehicle turn, thereby enabling lateral force in a vehicle turn to be borne even more effectively.

A fifth aspect of the present disclosure, in the above-described third and fourth aspects, may further include another electrical component disposed above the electrical component and is supported by the electrical component.

In the fifth aspect of the present disclosure, the other electrical component disposed above the electrical component is supported by the electrical component. Thus, in addition to the inertial mass of the cross member disposed at the vehicle front-rear direction inner side and the electrical component, the inertial mass of the other electrical component is also utilized to bear lateral force in a vehicle turn, thereby enabling lateral force when a vehicle turns to be borne even more effectively.

According to the above aspects, the present disclosure provides a vehicle lower section structure that may efficiently reinforce a suspension member.

BRIEF DESCRIPTION OF THE DRAWINGS

Exemplary embodiments will be described in detail based on the following figures, wherein.

DETAILED DESCRIPTION

Explanation follows regarding a vehicle lower section structure 10 according to an exemplary embodiment of the present disclosure, with reference to FIG. 1 to FIG. 8. Note that the arrow FR, the arrow UP, and the arrow LH in the drawings respectively indicate the front direction (direction of travel), upper direction, and left direction of the vehicle, as appropriate. Hereafter, unless specifically stated otherwise, reference simply to the front and rear, left and right, and upward and downward directions refers to the front and rear in a vehicle front-rear direction, left and right in a vehicle left-right direction (vehicle width direction), and upward and downward in a vehicle vertical direction. Moreover, in the drawings, some reference numerals and some members may be omitted in order to aid understanding of the drawings.

As illustrated in FIG. 1 to FIG. 8, the vehicle lower section structure 10 according to the present exemplary embodiment includes a front suspension member 30 that is installed at a lower front section of a vehicle 12. Left and right front suspensions 50 (see FIG. 4 and FIG. 5) are coupled to the front suspension member 30. A contactless charger (wireless charger) 60 and an AC/DC converter 70, serving as an electrical component, are attached to the front suspension member 30. Moreover, an inverter 80, serving as another electrical component, is attached to the AC/DC converter 70.

The vehicle 12 is, for example, an electric car that runs using drive force from an electric motor (not illustrated in the drawings) mounted to a rear section of a vehicle body. A storage battery (not illustrated in the drawings) for supplying power to the electric motor is mounted, for example, beneath a floor of a vehicle cabin. The contactless charger 60 and the AC/DC converter 70 are used to charge the storage battery, and the inverter 80 is configured to convert direct current, supplied by the storage battery, into alternating current and supply the alternating current to the electric motor. First, explanation will outline the overall configuration of a front section of the vehicle 12, followed in sequence by explanation regarding configuration of the front suspension member 30, the front suspension 50, the contactless charger 60, the AC/DC converter 70, and the inverter 80.

The front suspension member 30 is disposed at a vehicle lower side of a left and right pair of front side-members 14L, 14R extending in the vehicle front-rear direction, and is supported in a state hanging down from the left and right front side-members 14L, 14R. The left and right front side-members 14L, 14R each include a side-member front portion 14A at a vehicle front of a dash panel 16 and extending in the vehicle front-rear direction, and a kick portion 14B extending from a rear end of the side-member front portion 14A obliquely downward toward the vehicle rear and joined to a lower portion of the dash panel 16.

An elongated front bumper reinforcement 20 is joined to front ends of the left and right side-member front portions 14A through left and right crash boxes 18. The front ends of the left and right side-member front portions 14A are coupled together in a vehicle width direction by a radiator support 22, and rear portions of the left and right side-member front portions 14A are respectively joined to left and right suspension towers 24. Upper ends of the left and right suspension towers 24 are coupled to an upper end of the radiator support 22 by left and right coupling braces 26.

Figure 4:
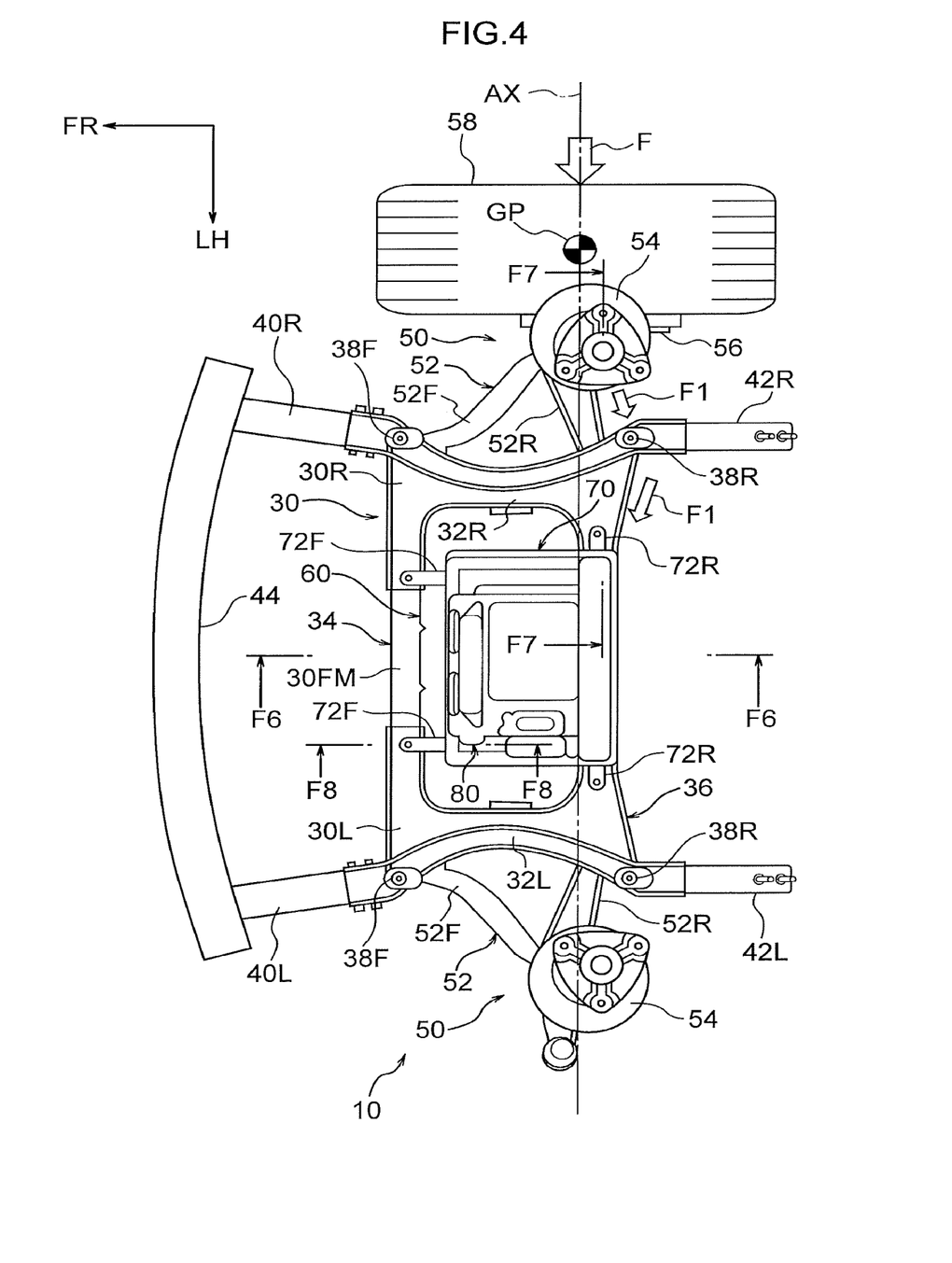
FIG. 4 is a plan view illustrating the configuration illustrated in FIG. 3, in a state viewed from above the vehicle.
Figure 5:
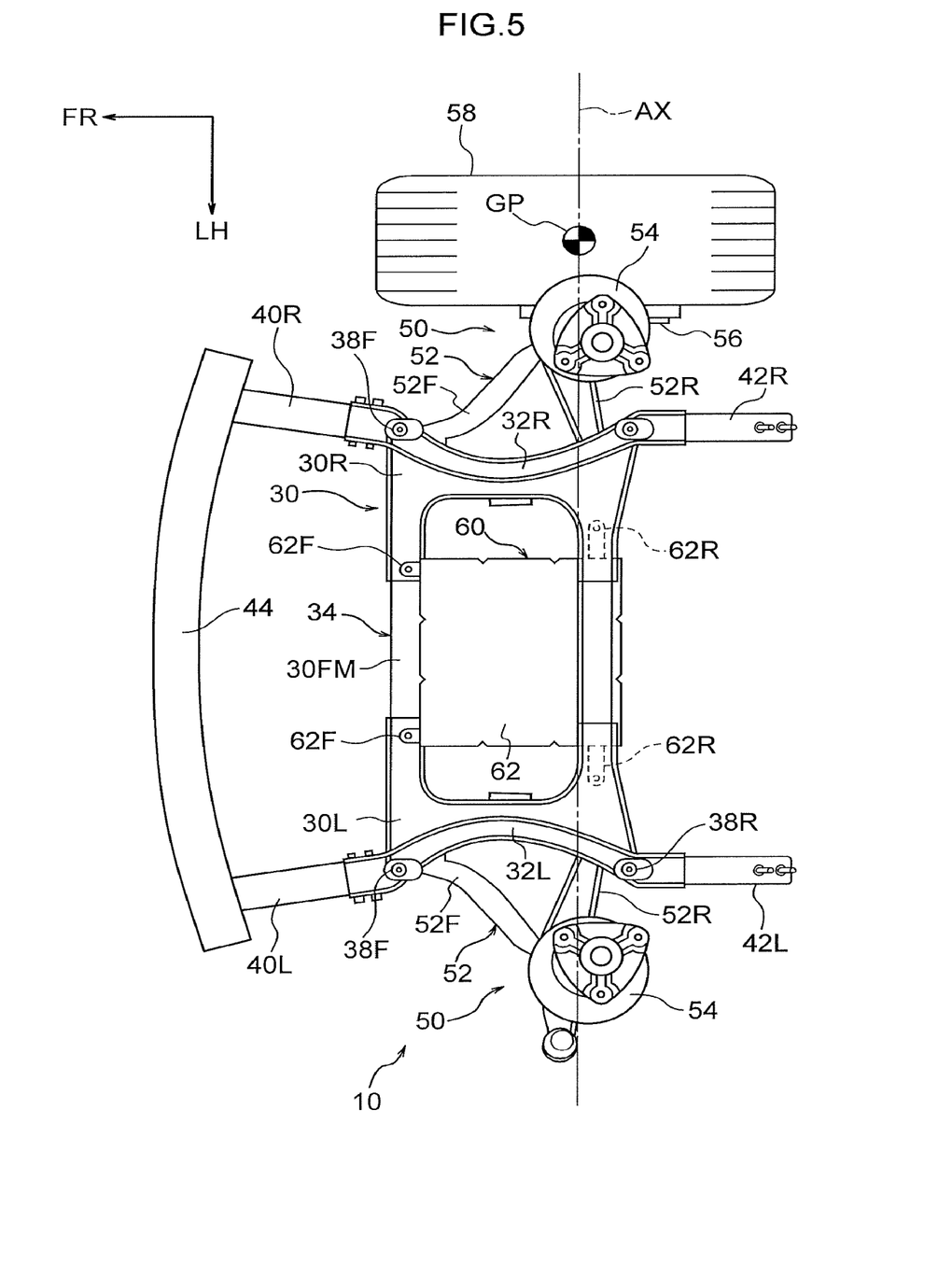
FIG. 5 is a plan view corresponding to FIG. 4, in which an AC/DC converter and an inverter have been omitted from illustration.
Figure 6:
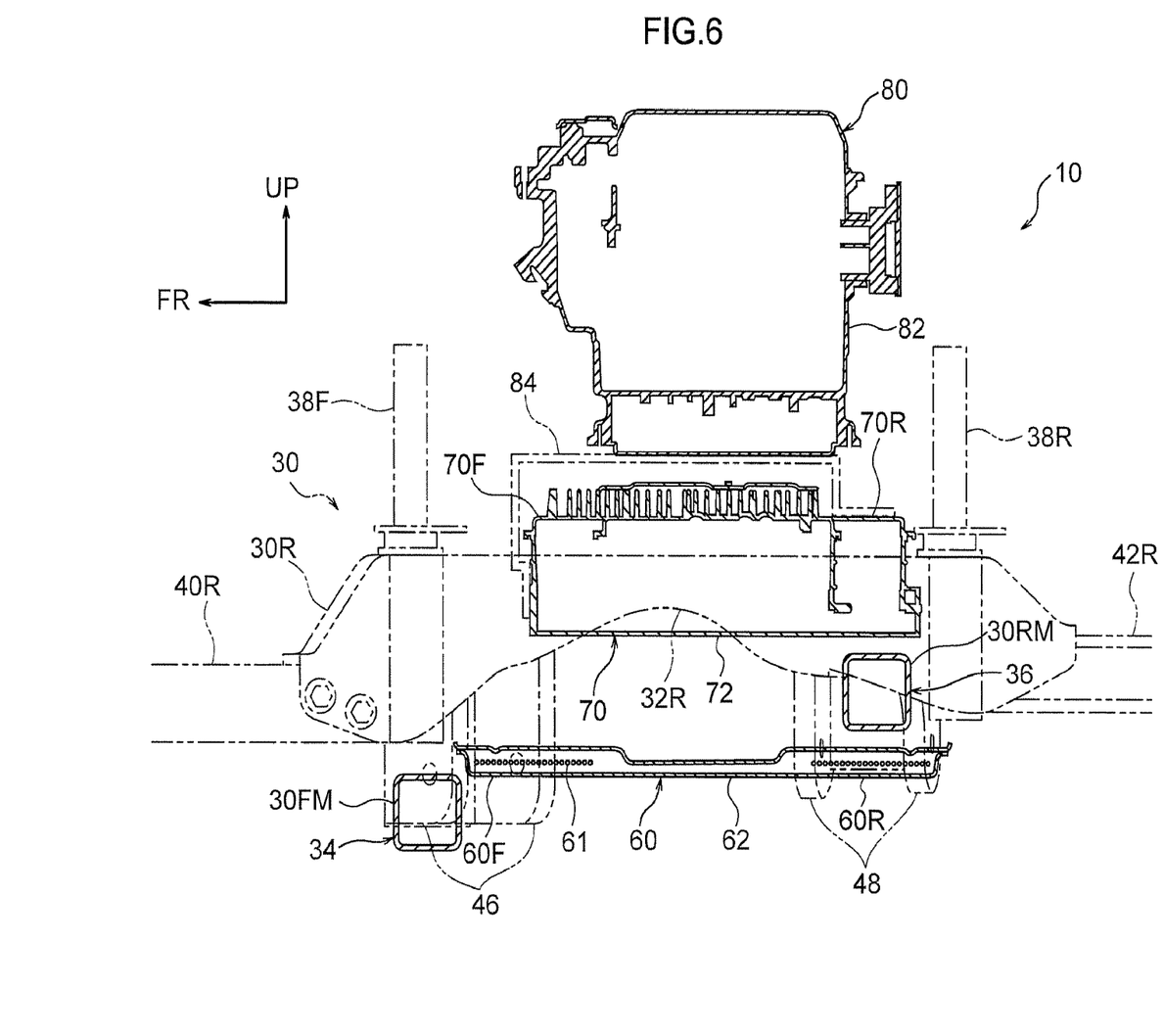
FIG. 6 is an enlarged cross-section taken along line F6-F6 in FIG. 4.

As illustrated in FIG. 2 to FIG. 6, the front suspension member 30 is formed in a frame shape that is configured by left and right side-rails 32L, 32R, a front cross member 34 coupling together front ends of the left and right side-rails 32L, 32R in the vehicle width direction, and a rear cross member 36 coupling together rear ends of the left and right side-rails 32L, 32R in the vehicle width direction. The front cross member 34 and the rear cross member 36 correspond to "front and rear cross members" of the present disclosure, and the rear cross member 36 corresponds to a "cross member at the vehicle front-rear direction inner side" of the present disclosure. As illustrated in FIG. 6, the front cross member 34 is disposed further to the vehicle lower side than the rear cross member 36.

Note that in the present exemplary embodiment, a front portion (front half) of the front suspension member 30 is the portion at the front when the front suspension member 30 is bisected into front and rear parts, and a rear portion (rear half) of the front suspension member 30 is the portion at the rear when the front suspension member 30 is bisected into front and rear parts. The front portion of the front suspension member 30 is configured by front portions (front halves) of the left and right side-rails 32L, 32R, and the front cross member 34. The rear portion of the front suspension member 30 is configured by rear portions (rear halves) of the left and right side-rails 32L, 32R, and the rear cross member 36. In the present exemplary embodiment, reference to "both the left and right sides" in relation to the front suspension member 30 means "both the left and right sides" with respect to a vehicle width direction center of the vehicle 12.

In the front suspension member 30, a left portion 30L configuring a left end of the front suspension member 30, and a right portion 30R configuring a right end of the front suspension member 30, are configured connected in the vehicle width direction by a front intermediate portion 30FM and by a rear intermediate portion 30RM respectively configuring left-right direction intermediate portions of the front suspension member 30. The left portion 30L and the right portion 30R are members that are produced by, for example, die-casting a lightweight metal material such as an aluminum alloy, and are formed with substantially U-shaped profiles open to the vehicle width direction inner side in plan view. The front intermediate portion 30FM and the rear intermediate portion 30RM are members that are produced by, for example, extrusion-molding a lightweight metal material such as an aluminum alloy, and are formed with elongated angular tube shapes with their axial directions in the vehicle width direction.

The left portion 30L is configured by integrating together the left side-rail 32L, a left end of the front cross member 34, and a left end of the rear cross member 36. The right portion 30R is configured by integrating together the right side-rail 32R, a right end of the front cross member 34, and a right end of the rear cross member 36. The front intermediate portion 30FM configures a vehicle width direction intermediate portion of the front cross member 34, and the rear intermediate portion 30RM configures a vehicle width direction intermediate portion of the rear cross member 36.

Figure 1:
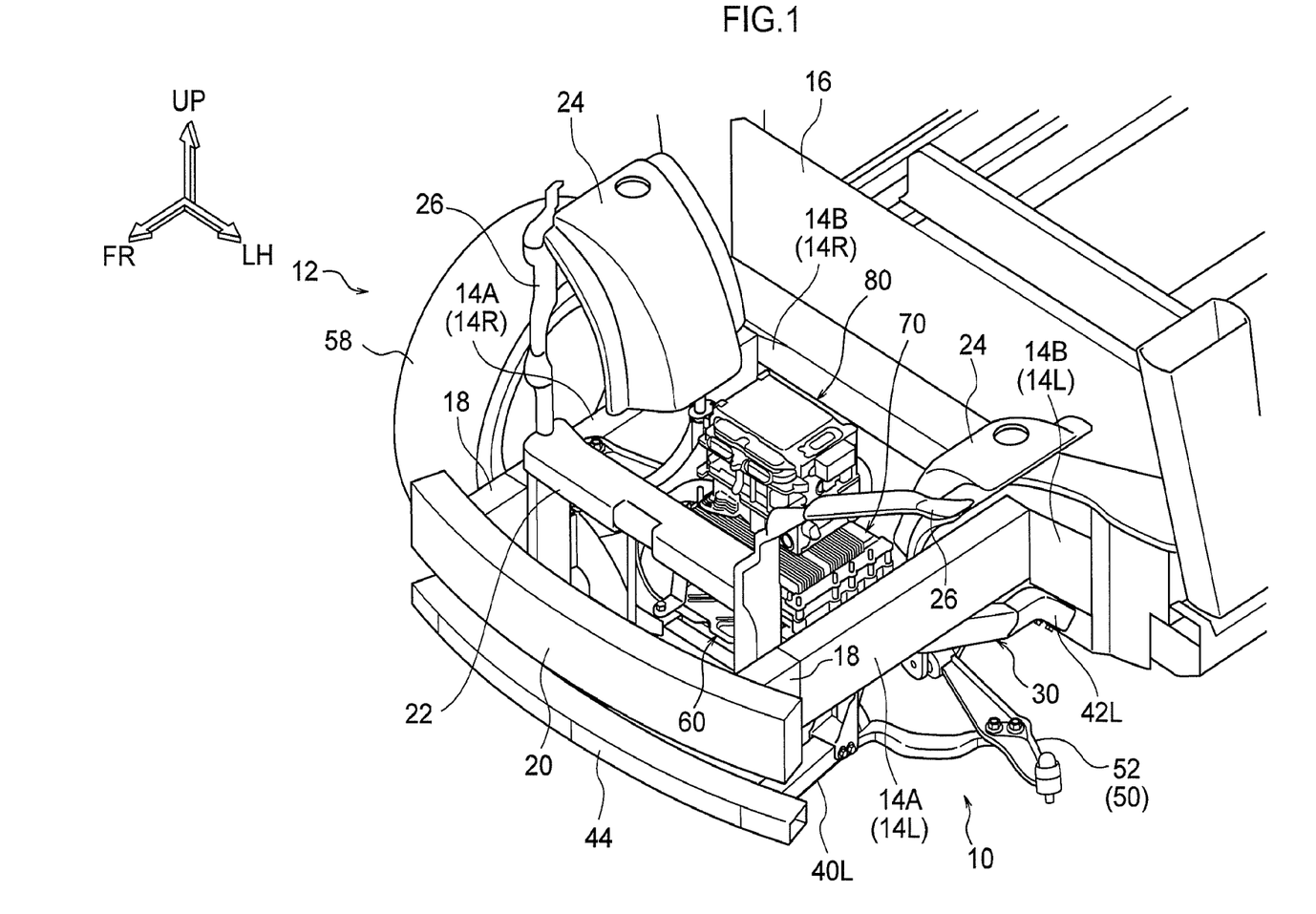
FIG. 1 is a perspective view illustrating configuration of main portions of a front section of a vehicle applied with a vehicle lower section structure according to an exemplary embodiment of the present disclosure, in a state in viewed from the front and oblique upper left of the vehicle.

The left and right side-rails 32L, 32R are disposed below the left and right front side-members 14L, 14R (see FIG. 1). Mounts 38F, 38R are provided at respective front ends and rear ends of both left and right side-rails 32L, 32R, and the left and right side-rails 32L, 32R are coupled to the left and right front side-members 14L, 14R at the mounts 38F, 38R. An under front bumper reinforcement 44 is joined to the front ends of the left and right side-rails 32L, 32R through left and right front coupling members 40L, 40R. The rear ends of the left and right side-rails 32L, 32R are respectively joined to the kick portions 14B of the left and right front side-members 14L, 14R through left and right rear coupling members 42L, 42R.

Figure 3:
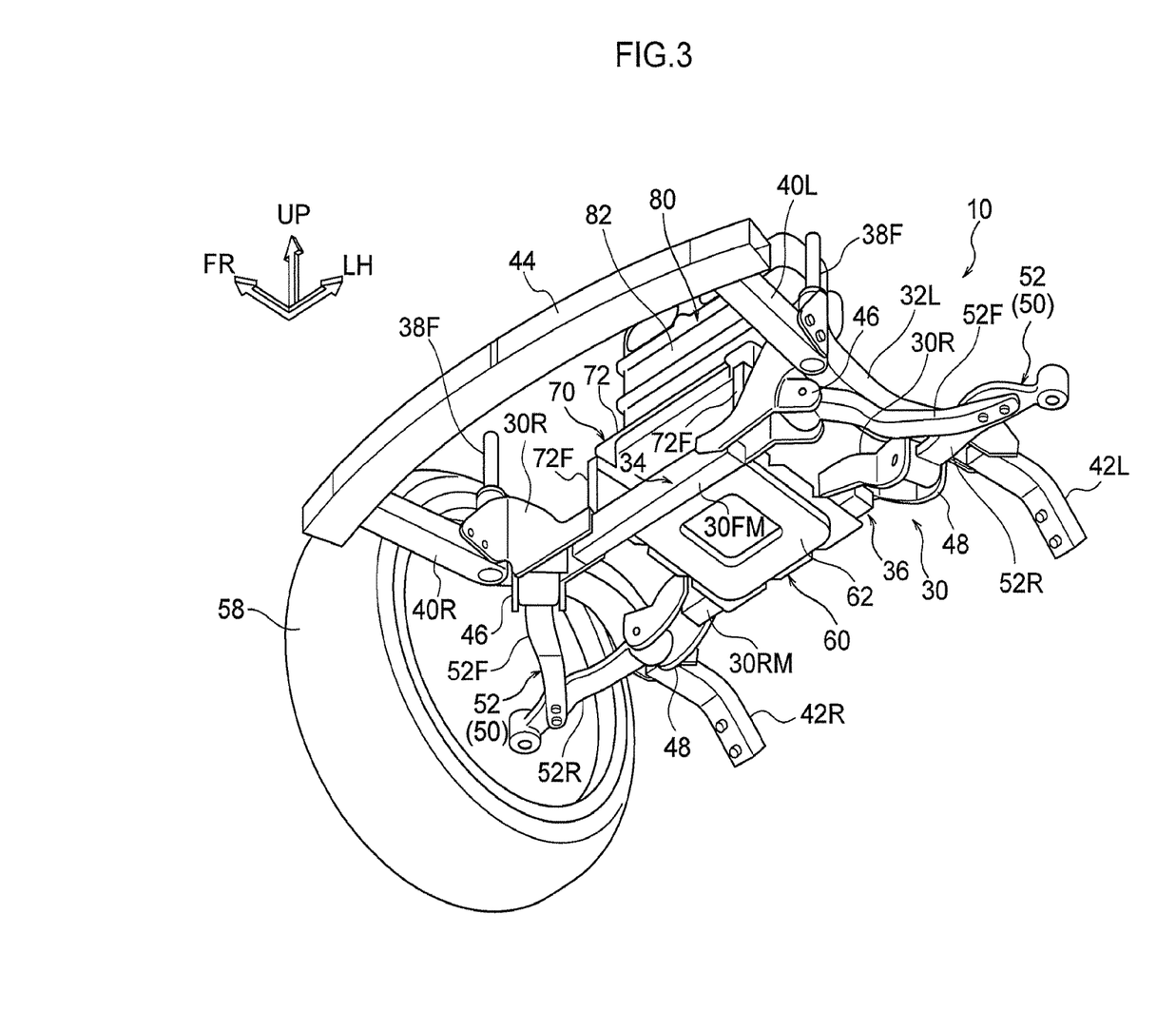
FIG. 3 is an enlarged perspective view illustrating part of the configuration illustrated in FIG. 1, in a state viewed from the front and oblique lower left of the vehicle.

Moreover, as illustrated in FIG. 3 and FIG. 6, front coupling portions 46 and rear coupling portions 48 are integrally provided integrated to lower faces of the front ends and rear ends of the left and right side-rails 32L, 32R. The front coupling portions 46 and rear coupling portions 48 are coupled together by lower arms 52 of the left and right front suspensions 50. The front coupling portions 46 and the front cross member 34 are arranged at positions aligned in the vehicle front-rear direction, and the rear coupling portions 48 and the rear cross member 36 are arranged at positions aligned in the vehicle front-rear direction.

As illustrated in FIG. 4 and FIG. 5, the left and right front suspensions 50 are strut suspensions, and each includes a lower arm 52 described above and a strut assembly 54 (illustrated only in FIG. 4 and FIG. 5). Upper ends of the strut assemblies 54 (illustrated only in FIG. 4 and FIG. 5) are fixed to upper walls of the suspension towers 24 (see FIG. 1), and lower ends of the strut assemblies 54 are coupled to front axle assemblies 56 (illustrated only in FIG. 4 and FIG. 5). A front wheel 58 (see FIG. 1 and FIG. 3 to FIG. 5) is attached to each front axle assembly 56. Note that the left front axle assembly 56 and the left front wheel 58 are omitted from illustration in FIG. 1 to FIG. 5.

Each lower arm 52 branches in a bifurcated shape toward the vehicle width direction inner side, and includes a front arm portion 52F and a rear arm portion 52R. Each front arm portion 52F is inclined toward the vehicle front on progression toward the vehicle width direction inner side, and a vehicle width direction inner end of each front arm portion 52F is axially supported by the front coupling portion 46. Each rear arm portion 52R is inclined slightly toward the vehicle front on progression toward the vehicle width direction inner side, and a vehicle width direction inner end of the rear arm portion 52R is axially supported by the rear coupling portion 48. A vehicle width direction outer end of each lower arm 52 is coupled to the front axle assemblies 56 described above.

As illustrated in FIG. 2, FIG. 3, and FIG. 5 to FIG. 8, the contactless charger 60 includes a flattened case 62 which has a small vehicle vertical direction dimension, and a secondary coil 61 (see FIG. 6) for receiving housed in the case 62. The case 62 is produced, for example, from sheet metal, and has a rectangular shape in plan view. The secondary coil 61 is configured to receive electricity transmitted from a primary transmitter coil, not illustrated in the drawings, installed to the ground by electromagnetic induction.

The contactless charger 60 is disposed at the vehicle width direction center section of the vehicle 12, and is arranged at a position aligned with the front suspension member 30 in the vehicle front-rear direction and vehicle vertical direction. More specifically, as illustrated in FIG. 6, a front end 60F, this being a vehicle front-rear direction outer end of the contactless charger 60, is disposed close to and obliquely to the vehicle upper rear of the front cross member 34, and a rear end 60R, this being the vehicle front-rear direction inner end of the contactless charger 60, is disposed close to and below the rear cross member 36. The contactless charger 60 is fastened to both the left and the right sides of the front cross member 34, and to both the left and the right sides of the rear cross member 36 (namely, the left and right sides of both the front portions and the rear portions of the front suspension member 30), and the contactless charger 60 is supported by the front suspension member 30.

Figure 8:
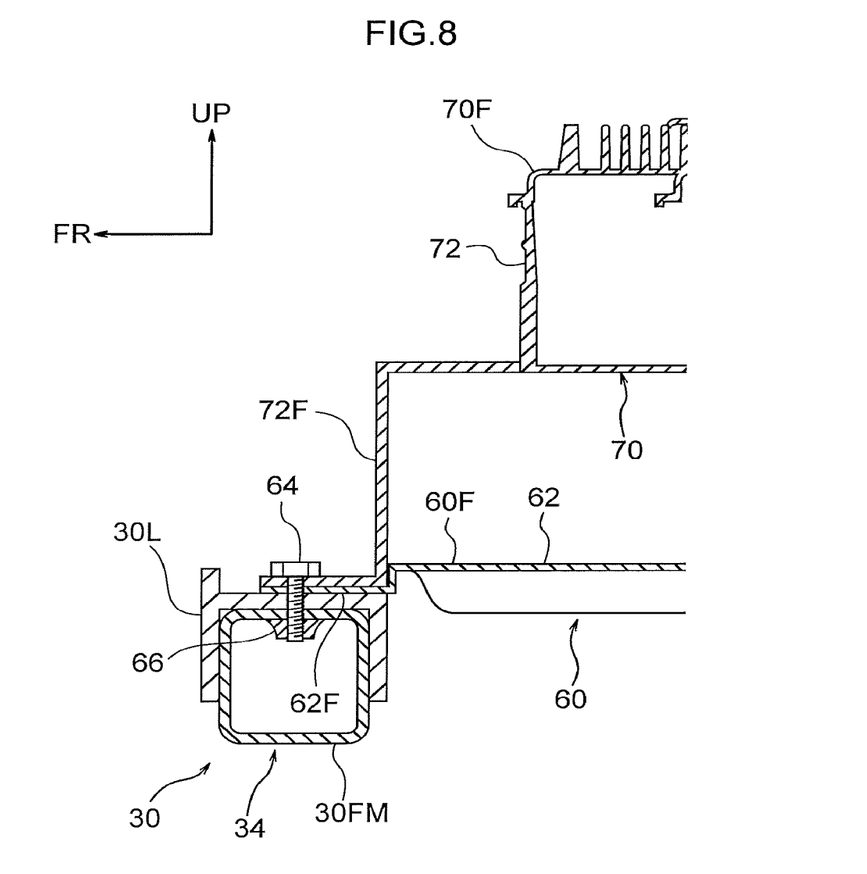
FIG. 8 is an enlarged cross-section taken along line F8-F8 in FIG. 4.

Specifically, as illustrated in FIG. 5 and FIG. 8, a left and right pair of fastening tabs 62F extend toward the vehicle front from both left and right ends of a front end of the case 62. The left and right fastening tabs 62F are bent into crank shapes toward the vehicle lower side, and leading ends of the fastening tabs 62F are superimposed with an upper face of the front cross member 34. Bolts 64 (see FIG. 2 and FIG. 8; omitted from illustration in FIG. 4) penetrating through the front cross member 34 and the leading ends of the left and right fastening tabs 62F are screwed into nuts 66 (see FIG. 8). Both the left and right ends at the front end of the contactless charger 60 are thereby fastened to the respective left and right sides (left and right ends) of the front cross member 34.

Figure 7:
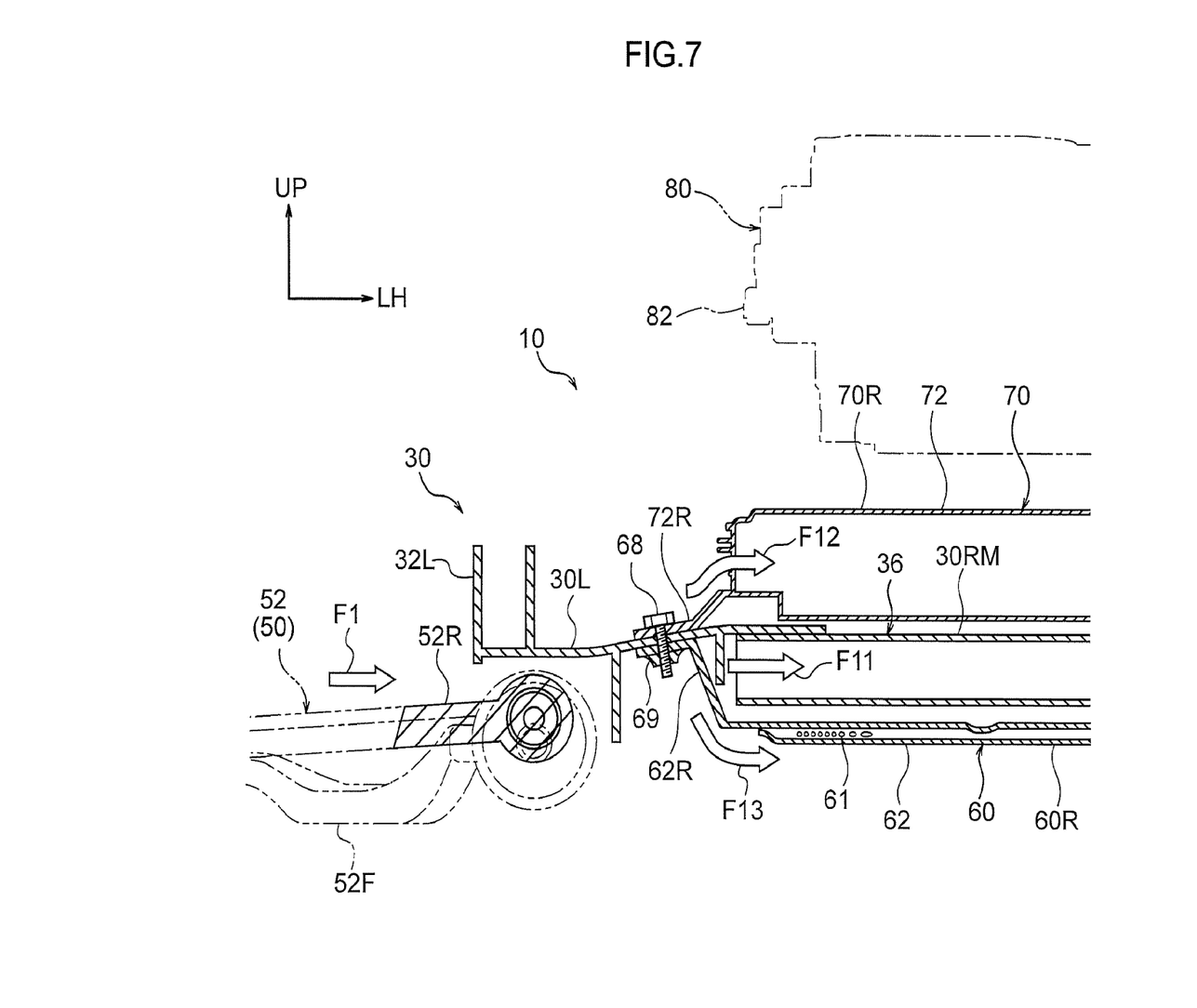
FIG. 7 is an enlarged cross-section taken along line F7-F7 in FIG. 4.

As illustrated in FIG. 5 and FIG. 7, a left and right pair of fastening tabs 62R extend toward the vehicle width direction outer sides from respective left and the right ends of a rear end of the case 62. The left and right fastening tabs 62R are bent into crank shapes toward the vehicle upper side, and leading ends of the fastening tabs 62R are superimposed with a lower face of the rear cross member 36. Bolts 68 (see FIG. 7; omitted from illustration in FIG. 4) penetrating through the rear cross member 36 and leading ends of the fastening tabs 62R are screwed into nuts 69 (see FIG. 7). Both the left and right ends at the rear end of the contactless charger 60 are thereby fastened to the respective left and right sides (left and right ends) of the rear cross member 36.

The AC/DC converter 70 is disposed at the vehicle width direction center of the vehicle 12, above the contactless charger 60. A converter body (not illustrated in the drawings) is configured housed inside a cuboidal case 72 with its length in the vehicle width direction, and the AC/DC converter 70 is electrically connected to the contactless charger 60. The AC/DC converter 70 and the front suspension member 30 are arranged at positions aligned in the vehicle front-rear direction and in the vehicle vertical direction.

More specifically, as illustrated in FIG. 6, the AC/DC converter 70, is disposed between the left and right side-rails 32L, 32R. A front end 70F, this being a vehicle front-rear direction outer end of the AC/DC converter 70, is disposed obliquely to the vehicle upper rear of the front cross member 34, and a rear end 70R, this being a vehicle front-rear direction inner end of the AC/DC converter 70, is disposed close to and above the rear cross member 36. The AC/DC converter 70 is fastened to both the left and right sides of the front cross member 34, and the left and right sides of the rear cross member 36 (namely, the left and right sides of both the front portion and the rear portion of the front suspension member 30), and is supported by the front suspension member 30.

Specifically, as illustrated in FIG. 2 to FIG. 4 and FIG. 8, a left and right pair of fastening tabs 72F respectively extend toward the vehicle front from left and right ends of the front end of the case 72. The left and right fastening tabs 72F are bent into crank shapes toward the vehicle lower side, and leading ends (front ends) of the left and right fastening tabs 72F are superimposed with the leading ends of the left and right fastening tabs 62F described above from the vehicle upper side. The bolts 64 (see FIG. 2 and FIG. 8) fastening the leading ends of the left and right fastening tabs 62F to the front cross member 34 penetrate leading ends of the respective left and right fastening tabs 72F. The bolts 64 and the nuts 66 (see FIG. 8) described above are used to fasten the leading ends of the left and right fastening tabs 62F to the front cross member 34. Namely, the AC/DC converter 70 and the contactless charger 60 are co-fastened to both the left and the right sides (the left and the right ends) of the front cross member 34.

Figure 2:
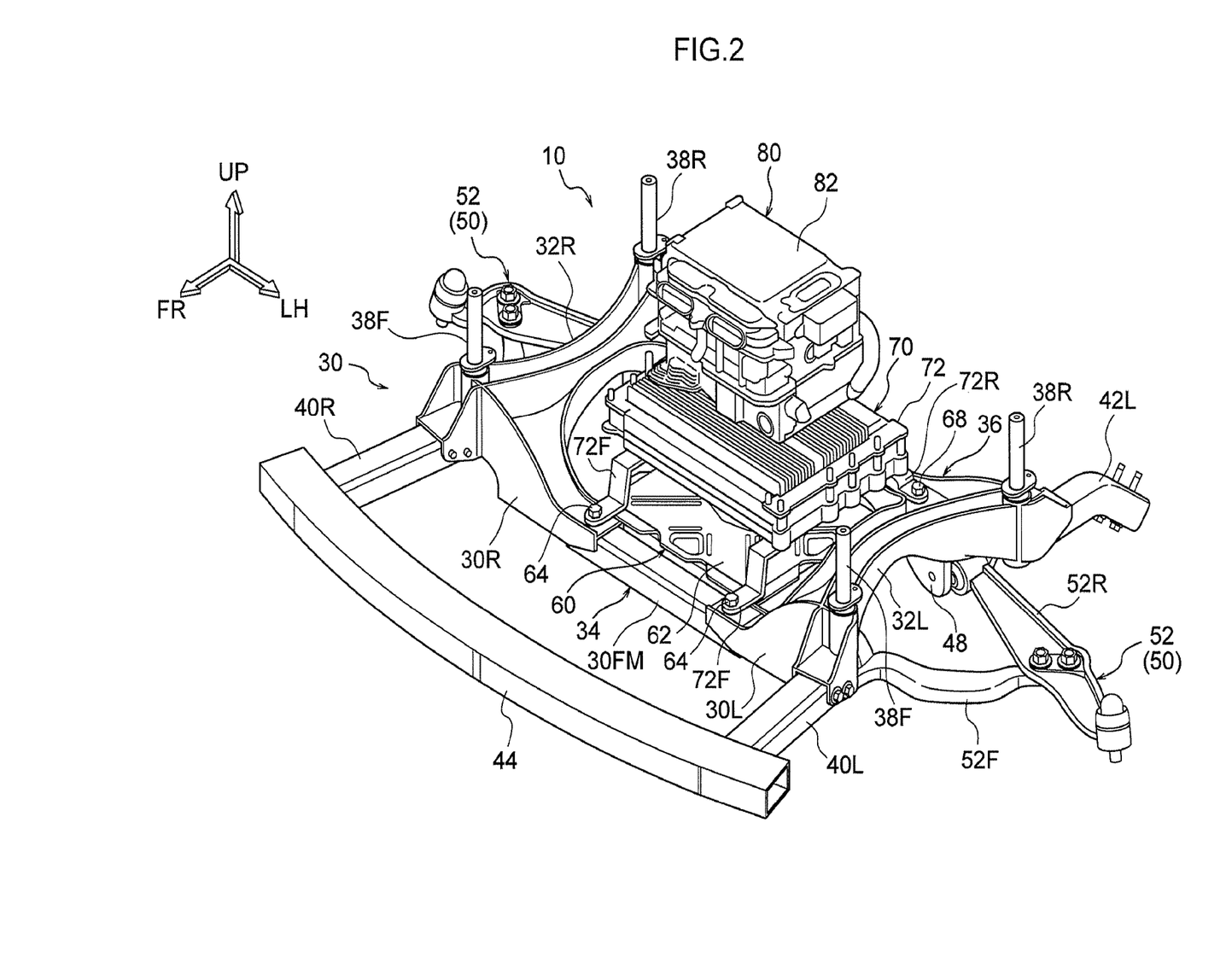
FIG. 2 is an enlarged perspective view illustrating part of the configuration illustrated in FIG. 1.

As illustrated in FIG. 2, FIG. 4, and FIG. 7, a left and right pair of fastening tabs 72R extend toward the vehicle width direction outer sides from left and right ends of a rear end of the case 72. The left and right fastening tabs 72R are bent into substantially crank shapes toward the vehicle lower side, and leading ends of the fastening tabs 72R are superimposed with the upper face of the rear cross member 36. The bolts 68 (see FIG. 7) fastening the left and right fastening tabs 62R of the contactless charger 60 to the rear cross member 36 respectively penetrate the leading ends of the left and right fastening tabs 72R. The bolts 68 and the nuts 69 (see FIG. 7) described above are used to fasten the leading ends of the left and right fastening tabs 72R to the rear cross member 36. Namely, the AC/DC converter 70 and the contactless charger 60 are co-fastened to both the left and the right sides (the left and the right ends) of the rear cross member 36.

The inverter 80 is disposed at the vehicle width direction center of the vehicle 12, above the AC/DC converter 70. The inverter 80 is configured such that an inverter body, not illustrated in the drawings, is housed inside a cuboidal case 82 with its length in the vehicle width direction. The inverter 80 and the AC/DC converter 70 are arranged at positions aligned in the vehicle front-rear direction. The inverter 80 is attached to the AC/DC converter 70 through a left and right pair of brackets 84 (illustrated only in FIG. 6) fixed to a lower face of the case 82, and the inverter 80 is supported by the front suspension member 30 through the AC/DC converter 70. The brackets 84 are, for example, formed by bending a strip of sheet metal, and are fixed to the case 82 of the inverter 80 and the case 72 of the AC/DC converter 70 by bolts or the like. Next, explanation follows regarding relevant portions of the present exemplary embodiment.

As described above, in the present exemplary embodiment, the contactless charger 60 and the AC/DC converter 70 are co-fastened to the left and right sides of both the front portion and the rear portion of the front suspension member 30 (the left and right sides of both the front cross member 34 and the rear cross member 36). As illustrated in FIG. 4 and FIG. 5, the lower arms 52 of the front suspensions 50 include the rear arm portions 52R extending in the vehicle width direction and overlapping a vehicle axle AX in plan view. The rear arm portions 52R are coupled to the rear coupling portions 48 (see FIG. 3 and FIG. 6) of the front suspension member 30. Note that GP in FIG. 4 and FIG. 5 indicates the ground contact point of the front wheel 58.

As illustrated in FIG. 2 to FIG. 7, in the present exemplary embodiment, the rear coupling portions 48, the rear cross member 36, this being a vehicle front-rear direction inner cross member, the rear end 70R of the AC/DC converter 70, and the rear end 60R of the contactless charger 60, are arranged at positions aligned in the vehicle front-rear direction. More specifically, the rear coupling portions 48 and the rear cross member 36 are disposed so as to overlap with each other when viewed in the vehicle width direction. The rear end 70R of the AC/DC converter 70 is disposed close to and above the rear cross member 36. The rear end 60R of the contactless charger 60 is disposed close to and below the rear cross member 36.

Next, explanation follows regarding operation and effects of the present exemplary embodiment.

The front suspension member 30 of the vehicle lower section structure 10 configured as described above is formed in a frame shape including the left and right side-rails 32L, 32R extending in the vehicle front-rear direction, and the front cross member 34 and the rear cross member 36 respectively coupling the left and right side-rails 32L, 32R in the vehicle width direction. The contactless charger 60 and the AC/DC converter 70, disposed above the contactless charger 60 and electrically connected to the contactless charger 60, are supported by the front suspension member 30.

The contactless charger 60 and the AC/DC converter 70 are respectively fastened to the left and right sides of the front portion and the rear portion of the front suspension member 30 (the left and right sides of both the front cross member 34 and the rear cross member 36). Accordingly, the contactless charger 60 and the AC/DC converter 70 function as members that reinforce the front suspension member 30. Thus, the present exemplary embodiment may efficiently reinforce the front suspension member 30 than a configuration in which a reinforcement structure configured as a plate is attached to the front suspension member 30.

Moreover, in the present exemplary embodiment, the contactless charger 60 and the AC/DC converter 70 are co-fastened to the front suspension member 30. Accordingly, the present exemplary embodiment may simplify the fastening structures of the contactless charger 60 and AC/DC converter 70, and may reduce the number of fastening processes and components, as well as the weight.

In the present exemplary embodiment, the rear arm portion 52R of the lower arm 52 included in the front suspension 50 is coupled to the rear coupling portion 48 of the front suspension member 30. The rear arm portion 52R extends in the vehicle width direction and overlaps the vehicle axle AX in plan view. The rear coupling portions 48 to which the rear arm portion 52R is coupled, the rear cross member 36 to which the AC/DC converter 70 is fastened, and the rear end 70R of the AC/DC converter 70 are arranged at positions aligned in the vehicle front-rear direction. This enables lateral force F (see FIG. 4) when the vehicle turns to be effectively borne by the inertial mass of the rear cross member 36 and the AC/DC converter 70. Accordingly, the present exemplary embodiment may improve handling stability of the vehicle 12. Note that the lateral force F illustrated in FIG. 4 is schematically illustrated as lateral force acting on the right front wheel 58 during a right turn by the vehicle 12. The arrows F1 illustrated in FIG. 4 and FIG. 7 schematically illustrate the force component out of the lateral force F that is transmitted to the front suspension member 30 through the rear arm portion 52R (referred to below as lateral force F1).

Moreover, in the present exemplary embodiment, in addition to the AC/DC converter 70, the contactless charger 60 is also fastened to the rear cross member 36, and the rear end 60R of the contactless charger 60 and the rear cross member 36 are arranged at positions aligned in the vehicle front-rear direction. Thus, in addition to the inertial mass of the rear cross member 36 and the AC/DC converter 70, the inertial mass of the contactless charger 60 is also utilized to bear lateral force F when the vehicle turns. Accordingly, the present exemplary embodiment may effectively borne the lateral force in a vehicle turn. As a result, the present exemplary embodiment may further improve handling stability of the vehicle 12.

Moreover, in the present exemplary embodiment, the AC/DC converter 70 and the contactless charger 60 are fastened to the left and right ends of the rear cross member 36. This enables lateral force F1 (see FIG. 4 and FIG. 7) transmitted to the front suspension member 30 through the rear arm portion 52R of the lower arm 52 to be borne dispersed between the three paths of the AC/DC converter 70, the rear cross member 36, and the contactless charger 60 (see arrows F11, F12, and F13 in FIG. 7). As a result, the present exemplary embodiment may suppress deformation of the rear cross member 36 due to the lateral force F1, and may further improve handling stability of the vehicle 12.

In the present exemplary embodiment, the inverter 80 disposed above the AC/DC converter 70 is supported by the front suspension member 30 through the AC/DC converter 70. Thus, in addition to the inertial mass of the rear cross member 36, the AC/DC converter 70, and the contactless charger 60, the inertial mass of the inverter 80 is also utilized to bear lateral force F in a vehicle turn. Thus, in the present exemplary embodiment may, lateral force in a vehicle turn may be borne even more effectively, and handling stability of the vehicle 12 may be further improved.

In the above exemplary embodiment, the front suspension 50 (suspension) is configured as a strut-type suspension. However, there is no limitation thereto, and the suspension may be double wishbone or multi-link suspension.

Moreover, the above exemplary embodiment is configured including the front suspension member 30. However, there is no limitation thereto, and the suspension member may be a rear suspension member.

In the above exemplary embodiment, a case in which the contactless charger 60 and the AC/DC converter 70 are configured respectively fastened to the left side and the right side of the front cross member 34 and the rear cross member 36, has been described. However, there is no limitation thereto. For example, one or both of the contactless charger 60 and the AC/DC converter 70 may be configured fastened to the front portion and the rear portion of the left and right side-rails 32L, 32R. Moreover, for example, one or both of the contactless charger 60 and the AC/DC converter 70 may be configured to the left side and the right side of one out of the front cross member 34 or the rear cross member 36, and fastened to the left and right side-rails 32L, 32R.

Moreover, in the above exemplary embodiment, the AC/DC converter 70 is configured as an electrical component, and the inverter 80 is configured as another electrical component. However, there is no limitation thereto, and an electrical component and another electrical component may be configured by other types of electrical components (electric components), such as a power control unit that controls output of a storage battery.

Moreover, various other modifications may be implemented within a range not departing from the spirit of the present disclosure. The scope of rights of the present disclosure is obviously not limited to the exemplary embodiment described above

What is claimed is:

1. A vehicle lower section structure, comprising:
   a suspension member formed in a frame shape;
   a contactless charger supported by the suspension member; and
   an electrical component disposed above the contactless charger and electrically connected to the contactless charger, the electrical component being supported by the suspension member.

2. The vehicle lower section structure of claim 1, wherein the suspension member includes left and right side-rails extending in a vehicle front-rear direction, and a front cross member and a rear cross member coupling the left and right side-rails together in a vehicle width direction.

3. The vehicle lower section structure of claim 2, wherein the contactless charger is fastened to both of a front portion and a rear portion of the left and right side-rails.

4. The vehicle lower section structure of claim 2, wherein the electrical component is fastened to both of a front portion and a rear portion of the left and right side-rails.

5. The vehicle lower section structure of claim 2, wherein the contactless charger is fastened to the front cross member and to a rear portion of each of the left and right side-rails.

6. The vehicle lower section structure of claim 2, wherein the electrical component is fastened to the front cross member and to a rear portion of each of the left and right side-rails.

7. The vehicle lower section structure of claim 2, wherein the contactless charger is fastened to the rear cross member and to a front portion of each of the left and right side-rails.

8. The vehicle lower section structure of claim 7, wherein the rear cross member and an end portion at a vehicle front-rear direction inner side of the contactless charger are arranged at positions that are aligned in the vehicle front-rear direction.

9. The vehicle lower section structure of claim 2, wherein the electrical component is fastened to the rear cross member and to a front portion of each of the left and right side-rails.

10. The vehicle lower section structure of claim 9, further comprising a suspension structure including a lower arm, wherein:
    the lower arm includes an arm portion extending in the vehicle width direction and overlapping a vehicle axle in plan view, the arm portion being coupled to the suspension member;

a coupling portion of the arm portion coupled to the suspension member, the rear cross member, and an end portion at a vehicle front-rear direction inner side of the electrical component, are arranged at positions that are aligned in the vehicle front-rear direction.

11. The vehicle lower section structure of claim 1, further comprising an additional electrical component disposed above the electrical component and supported by the electrical component.

* * * * *